Oct. 9, 1962      S. R. JOHNSON      3,057,457
CAN BODY CONVEYING MEANS
Filed Jan. 26, 1959      3 Sheets-Sheet 1
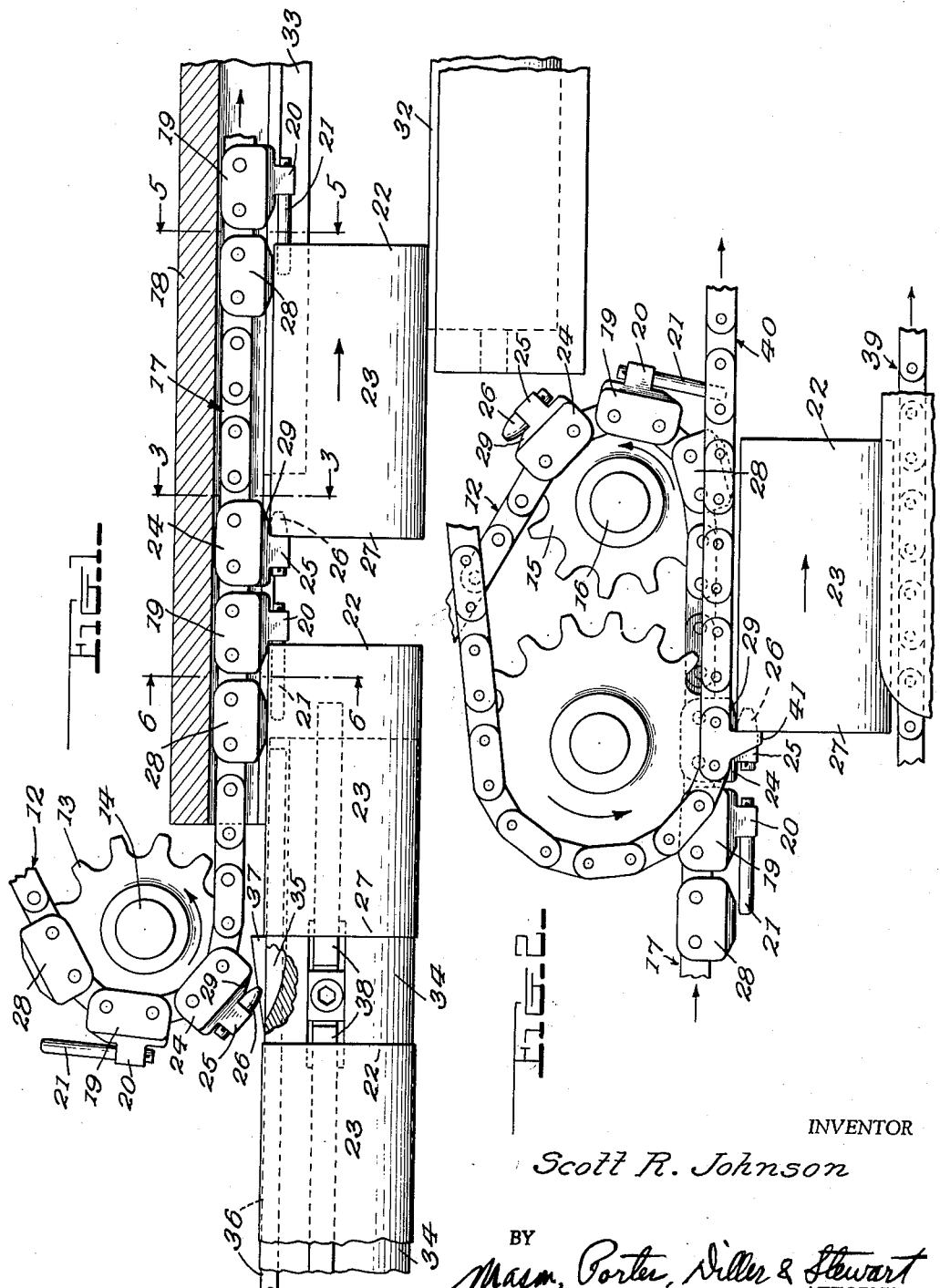
INVENTOR
Scott R. Johnson
BY
ATTORNEYS Oct. 9, 1962　　　S. R. JOHNSON　　　3,057,457
CAN BODY CONVEYING MEANS
Filed Jan. 26, 1959　　　　　　　　　　　　3 Sheets-Sheet 2
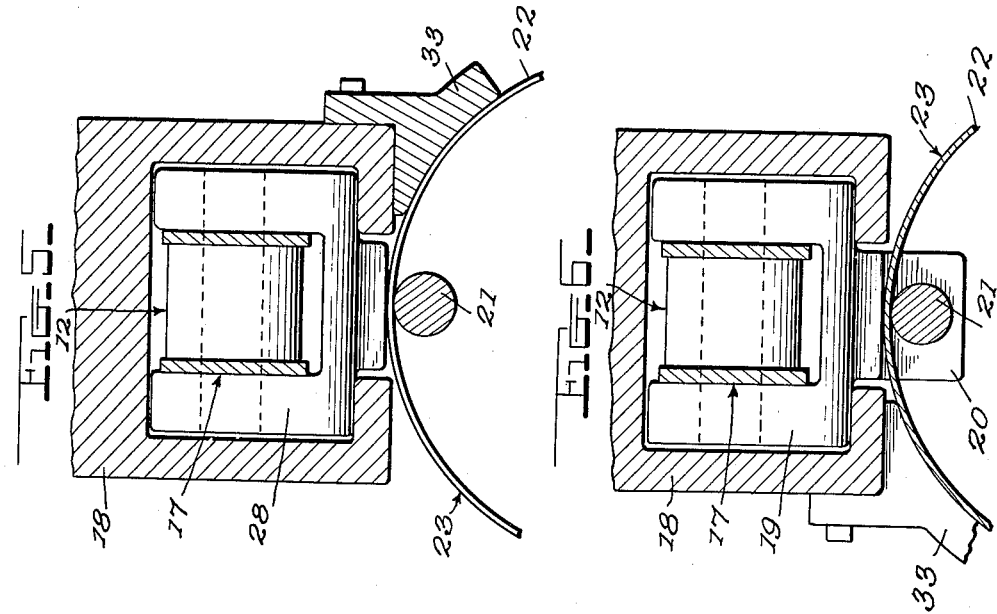
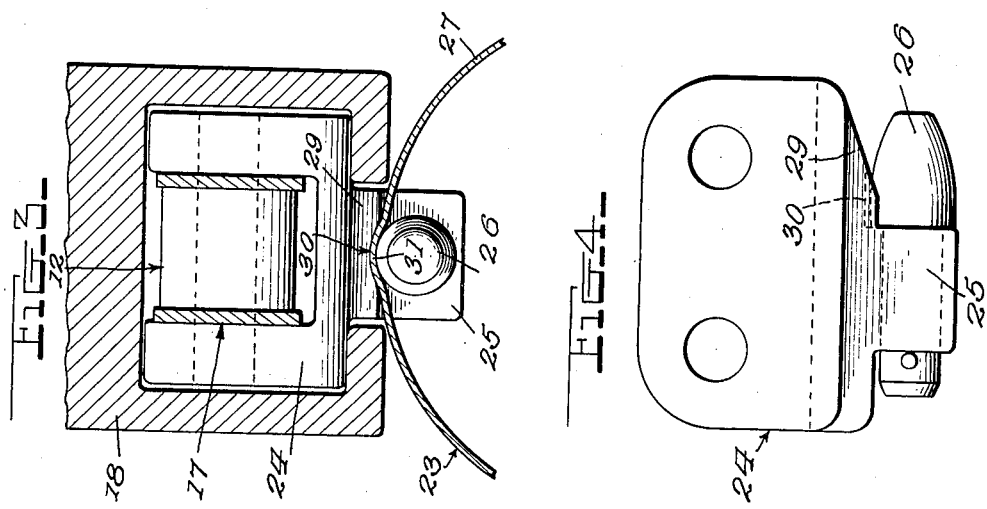
INVENTOR
Scott R. Johnson
BY
Mason, Porter, Diller &
ATTORNEYS

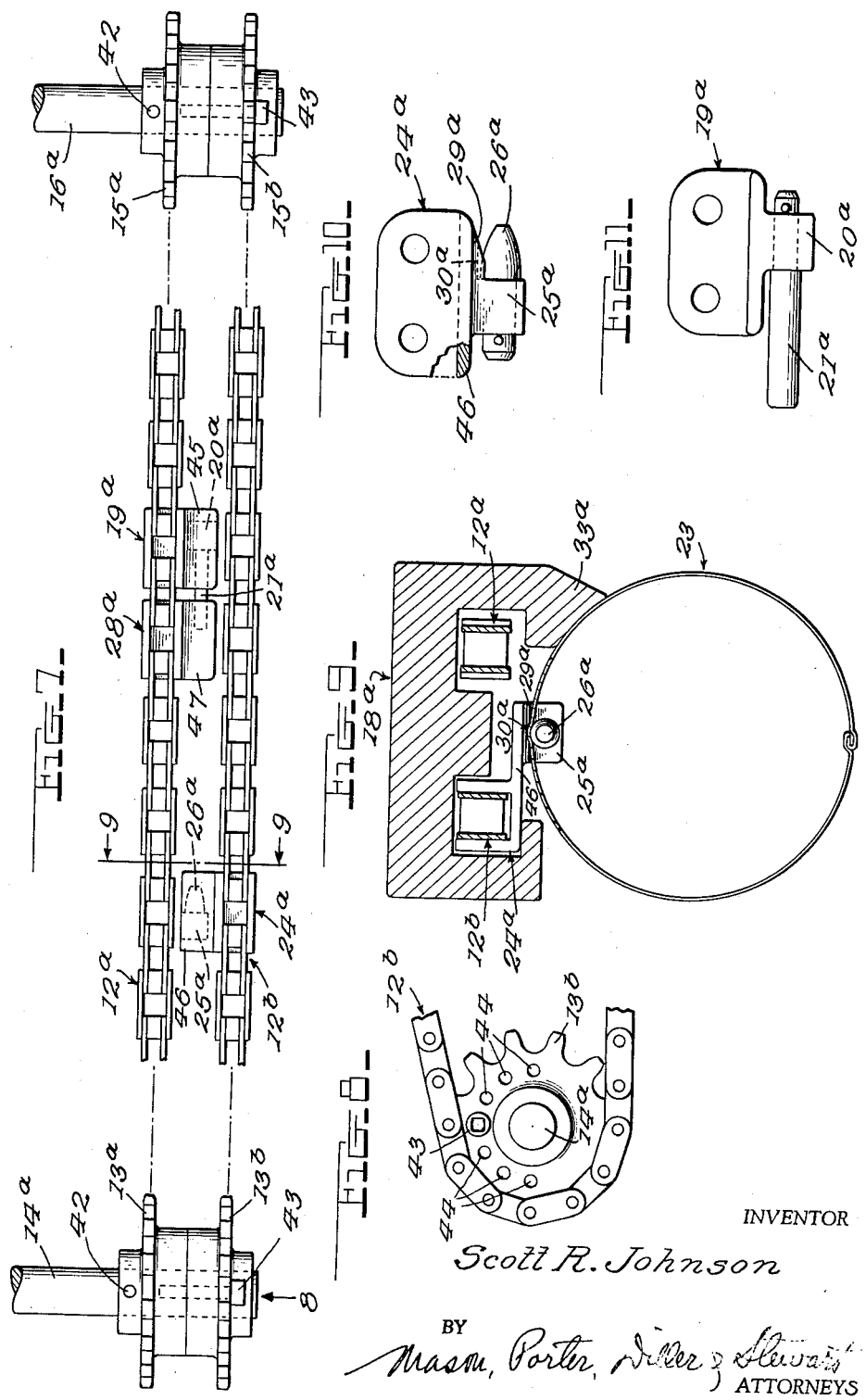

United States Patent Office 3,057,457
Patented Oct. 9, 1962

3,057,457
CAN BODY CONVEYING MEANS
Scott R. Johnson, River Forest, Ill., assignor to Continental Can Company, Inc., New York, N.Y., a corporation of New York
Filed Jan. 26, 1959, Ser. No. 789,055
11 Claims. (Cl. 198—179)

This invention relates to a new and improved means for conveying can bodies: and the principal use of the invention is for conveying such bodies from a body maker through a side seamer and depositing them on a cooling conveyor in readiness for end flanging.

As in a number of prior mechanisms, a track-guided chain conveyor is employed for processionally moving the can bodies. However, some of such prior mechanisms require complicated body-gripping fingers actuated by cams or otherwise, in order to hold the can bodies firmly engaged with the chain conveyor, to thereby confine the bodies to the proper path. In other prior mechanisms, while such gripping fingers are not required and mere body-pushing lugs are provided on the chain conveyor, either magnetic rails are required to support the can bodies and prevent them from deviating from the proper path, or other external or internal guides are necessary to perform these functions.

The principal object of the present invention has been to provide a new and improved construction in which (1) pairs of fingers are allotted one pair to each conveyed can body and are fixedly secured to the chain conveyor; (2) in which the first and second fingers of said pairs enter the leading and trailing ends, respectively, of the can bodies; and (3) in which said fingers adequately connect the can bodies with the chain conveyor, thereby greatly simplifying prior constructions.

A further object has been to provide the chain conveyor with a hold-down position to prevent upward movement of the leading end of each can body from the finger in said leading end, and to also provide said chain conveyor with a portion which coacts with the finger in the trailing end of the can body to grip this trailing end, thereby holding the can body against possible turning about its longitudinal axis and also holding said trailing end against possible upward movement from the finger therein.

The mounting and driving means for the chain conveyor includes front and rear sprocket means which provide said chain conveyor with a horizontal lower flight, the fingers of which engage the can bodies: and another object of the invention has been (1) to provide can body guide means extending under the front end of said lower flight; (2) to provide for feeding a can body along said guide means and engaging the leading end of said can body with the first finger of a pair after this finger arrives under said lower flight; and (3) to provide brake means for then stationarily holding the can body while the second finger of the pair travels downwardly around the front sprocket means and engages the trailing end of the can body, said first finger being sufficiently long to prevent it from being completely withdrawn from the can body during the travel of the chain conveyor with respect to the temporarily held can body.

A further object has been to provide the aforesaid can body guide means in the form of a stub horn which is recessed to clear the fingers of the chain conveyor, and to provide this horn with the aforesaid brake means constructed for frictional contact with each can body fed along said horn.

A still further object has been to provide for withdrawing each conveyed can body from the finger which engages its trailing end, after the finger which has engaged its leading end has freed this end by upwardly travelling around the rear sprocket means.

Yet another object has been (1) to form the chain conveyor from two parallel chains disposed abreast of each other; (2) to mount one finger of each of the aforesaid pairs on one of said chains; (3) to mount the second finger of each pair on the other of said chains; and (4) to provide for relative longitudinal adjustment of the two chains to vary the spacing of the two fingers in accordance with the length of the can bodies to be conveyed.

Still another object has been to provide an abutment rail to hold the can bodies against any lateral movement under the influence of the conventional rotating roll commonly used to apply solder to the can body side seams.

With the above and other objects in view that will hereinafter appear, the nature of the invention will be more clearly understood by reference to the following detailed description, the appended claims and the several views illustrated in the accompanying drawings.

In the drawings:

FIGURE 1 is a fragmentary side elevation, partly in section, showing a single-chain form of the invention.

FIGURE 2 is a fragmentary side elevation showing the rear end of the chain conveyor and the means for withdrawing the conveyed can bodies therefrom.

FIGURE 3 is a transverse sectional view on line 3—3 of FIGURE 1, showing one of the fingers which engage the trailing ends of the can bodies, and the chain link on which the finger is mounted.

FIGURE 4 is a side elevation of the finger and link shown in FIGURE 3.

FIGURE 5 is a transverse sectional view on line 5—5 of FIGURE 1, showing the relation of one of the fingers for the leading ends of the can bodies with one of the hold-down links.

FIGURE 6 is a transverse sectional view on line 6—6 of FIGURE 1, showing one of the fingers for the leading ends of the can bodies and the link on which the finger is mounted.

FIGURE 7 is a partial plan view showing a form of construction in which the chain conveyor comprises two chains.

FIGURE 8 is a detail elevation of the front sprocket means of FIGURE 7, as indicated by the arrow 8 of the latter.

FIGURE 9 is a transverse sectional view on line 9—9 of FIGURE 7, showing a can body engaged with one of the fingers which are receivable in the trailing ends of the can bodies, and the link on which the finger is mounted.

FIGURE 10 is a side elevation, partly broken away, showing the finger and link illustrated in FIGURE 9.

FIGURE 11 is a side elevation showing the relatively long finger of FIGURE 7 and the link on which the finger is mounted.

In the form of construction shown in FIGURES 1 to 6, a single-chain conveyor 12 is provided. The mounting and driving means for the conveyor 12 includes a front sprocket 13 on a shaft 14, and a rear sprocket 15 on a shaft 16. This shaft is suitably driven. The lower flight 17 of the conveyor 12 extends horizontally between the lower portions of the sprockets 13 and 15 and is guided by a fixed track 18.

The chain conveyor 12 includes longitudinally spaced pairs of channeled links. One link of each pair is identified at 19: and the link bottom has a lug 20 to which a relatively long finger 21 is fixedly secured in position to underlie and extend longitudinally of the lower chain conveyor flight 17 for reception in the leading end 22 of a can body 23.

The second channeled link of each pair is denoted at

24; and the link bottom has a lug 25 to which a relatively short tapered finger 26 is fixedly secured in position to underlie the chain conveyor flight 17 for reception in the trailing end 27 of the can body 23.

The chain conveyor 12 also includes channeled hold-down links 28 immediately following the links 19; and said hold-down links on the conveyor flight 17 overlie the free end portions of the relatively long fingers 21. Their function is to hold the leading ends 22 of the can bodies against any upward movement from the fingers 21 but no actual gripping of the can bodies occurs between these fingers 21 and the hold-down links 28.

Each channeled link 24 has an inclined lug portion 29 on the link bottom and disposed in diverging relation with the tapered finger 26, as best seen in FIGURES 3 and 4. The lug portion 29 has a shallow groove 30 into which the peripheral portion of the finger 26 extends slightly. The grove 30 and the finger 26 coact in springing a restricted portion 31 (FIGURE 3) of the can body end 27 into distorted form when the finger 26 is forced into said can body end 27. This body end 27 is thus solidly gripped and held against any upward movement from the finger 26 and the can body is also held against any turning about its axis, under the influence of the usual rotating solder roll 32 over which the can bodies are conveyed for side seam soldering.

Any tendency of the solder roll to laterally move the lower portions of the can bodies 23 and thus possibly cause faulty or unsightly seams may be resisted by a suitably located abutment rail. Such a rail is shown at 33 attached to the chain conveyor guide rail 18.

A stub horn 34 (FIGURE 1) receives the can bodies 23 from the body maker and extends horizontally under the front end portion of the chain conveyor flight 17, said horn being suitably recessed at 35 to clear the lugs 20 and 25 and the fingers 21 and 26.

The can bodies are fed step-by-step along the horn 34 by conventional feed means including a feed bar 36 having dogs, one of which is shown at 37. The horn 34 is provided with spring-pressed brake shoes 38 to frictionally contact with the can bodies and hold them in their successive positions.

When a finger 21 arrives under the front end portion of the chain conveyor flight 17, the feed bar 36 operates and the dog 37 moves a can body 23 partly from the horn 34 and slides the leading end 22 of said body under the hold-down link 28 and onto said finger 21, as seen at the left of FIGURE 1. The can body is stationarily held in this position by the brake means 38 while the following finger 26 is moving around the sprocket 13 and into engagement with the trailing end 27 of the can body. While this movement and engagement are occurring, the finger 21 withdraws somewhat from the can body but is sufficiently long to prevent complete withdrawal therefrom. When engagement of the finger 26 with the can body is complete and the trailing end 27 of said body is gripped as shown in FIGURE 3, the carrying lug 25 of said finger 26 slides the can body from the stub horn 34 and the body is then supported and conveyed as seen at the right of FIGURE 1. When the can body seam engages the solder roll 32, the hold-down link 28 prevents any upward movement of the leading body end 22; the gripping of the trailing body end 27 prevents any upward movement of this end and prevents the can body from being turned about its axis by the rotating solder roll 32; and the rail 33 holds the can body against lateral displacement under the influence of said solder roll.

After each can body leaves the solder roll 32 and the seam is wiped as usual, said body is removed from the chain conveyor and deposited upon a cooling conveyor or the like 39 (FIGURE 2). An extractor chain 40 is shown having lugs 41 for withdrawing the trailing ends of the can bodies 23 from the fingers 26 after the fingers 21 have cleared the leading ends 22 by passage around the rear sprocket 15.

In the form of construction shown in FIGURES 7 to 11, the chain conveyor comprises two parallel chains 12$^a$ and 12$^b$ disposed abreast of each other. The chain 12$^a$ includes channeled links 19$^a$ carrying the fingers 21$^a$ and also includes channeled hold-down links 28$^a$. The chain 12$^b$ includes channeled links 24$^a$ carrying the fingers 26$^a$. The chain 12$^a$ is trained around a front sprocket 13$^a$ on a shaft 14$^a$ and around a rear sprocket 15$^a$ on a shaft 16$^a$. The chain 12$^b$ is trained around a front sprocket 13$^b$ on the shaft 14$^a$ and around a rear sprocket 15$^b$ on the shaft 16$^a$.

Provision is made for relatively adjusting the front sprockets 13$^a$ and 13$^b$ circumferentially, and for likewise relatively adjusting the rear sprockets 15$^a$ and 15$^b$. Thus, the two chains 12$^a$ and 12$^b$ may be relatively adjusted to change the distance between the finger 21$^a$ and the finger 26$^a$, to adapt the conveyor for handling can bodies of different lengths.

For illustrative purposes, the sprockets 13$^a$ have been shown as pinned at 42 to the shafts 14$^a$ and 16$^a$, respectively; the sprockets 13$^b$ and 15$^b$ have been shown as turnable on said shafts; and screws 43 have been shown for securing the turnable sprockets to the pinned sprockets. These screws may be passed through any of a series of openings 44 in the sprockets 13$^b$ and 15$^b$ and they are threaded into the sprockets 13$^a$ and 15$^a$.

Each link 19$^a$ has a lateral extension 45 carrying the lug 20$^a$ on which the finger 21$^a$ is mounted; each link 24$^a$ has a lateral extension 46 carrying the mounting lug 25$^a$ for the finger 26$^b$; and each link 28$^a$ has a lateral extension 47 to overlie the finger 21$^a$. The extension 46 is provided with formations 29$^a$ and 30$^a$ corresponding to the formations 29 and 30 of the links 24.

A double track 18$^a$ (FIGURE 9) is provided for the two chains 12$^a$ and 12$^b$ and an abutment rail 33$^a$ is shown as formed integrally with said rail.

From the foregoing, it will be seen that novel and advantageous construction has been disclosed for attaining the desired ends. However, attention is invited to the possibility of making variations within the scope of the invention as claimed.

I claim:

1. In a can body conveying means, a fixed horizontal chain guiding track under which can bodies are to be processionally advanced, a chain conveyor having a lower flight guided by said track, mounting and driving means for said chain conveyor including front sprocket means which curves said chain conveyor downwardly to said lower flight, pairs of can body supporting and conveying fingers mounted on said chain conveyor in positions to longitudinally underlie said lower flight, the fingers of each pair being spaced apart longitudinally and extending toward each other, one finger of each pair being receivable in the leading end of a can body being conveyed, the second finger of each pair being receivable in the trailing end of the can body, guide means extending under the front end of said lower reach in position to guide a can body into engagement with said one finger of any pair after this finger arrives under said lower flight, feed means for sliding a can body along said guide means into engagement with said one finger while the second finger is moving downwardly around said front sprocket means, and brake means for stationarily holding the can body in the position to which it has been slid by said feed means to allow said second finger to engage the can body, said one finger being sufficiently long to prevent it from completely withdrawing from the can body while said second finger is engaging said can body.

2. A structure as specified in claim 1, in which said mounting and driving means for said chain conveyor includes rear sprocket means which curves said chain conveyor upwardly from said lower flight, and means for longitudinally withdrawing each conveyed can body from said second finger of its respective pair when said one finger of this pair has cleared the can body by upwardly travelling around said rear sprocket means.

3. A structure as specified in claim 1, in which said chain conveyor has portions cooperating with the second fingers of said pairs in gripping the trailing ends of the can bodies and holding these trailing ends against upward movement, said chain conveyor also having portions to lie upon the can bodies and hold the leading ends thereof against upward movement from the first fingers of said pairs.

4. A structure as specified in claim 1, in which said can body guide means consists of a stub horn recessed to clear said fingers, said brake means being carried by said stub horn and being constructed to frictionally contact with the inner sides of can bodies on said horn.

5. A structure as specified in claim 1, in which said chain conveyor has portions cooperating with the second fingers of said pairs in gripping the trailing ends of the can bodies and holding these trailing ends against upward movement, said chain conveyor also having portions to lie upon the can bodies and hold the leading ends thereof against upward movement from the first fingers of said pairs, and a longitudinal abutment rail mounted in position to laterally abut the can bodies as they are being conveyed, to thereby resist lateral movement of said can bodies in one direction.

6. A structure as specified in claim 1, in which said chain conveyor consists of a single chain carrying all of said first and second fingers.

7. A structure as specified in claim 1, in which said chain conveyor consists of two chains, and in which said mounting and driving means includes means permitting relative longitudinal adjustment of said chains, said one finger of each pair being mounted on one of said chains, said second finger of each pair being mounted on the other of said chains.

8. A structure as specified in claim 1, in which said chain conveyor consists of two chains, and in which said mounting and driving means includes means permitting relative longitudinal adjustment of said chains, said one finger of each pair being mounted on one of said chains, said second finger of each pair being mounted on the other of said chains, said one of said chains being provided with hold-down portions to prevent the leading ends of the can bodies from moving upwardly from their respective fingers.

9. A structure as specified in claim 1, in which said chain conveyor consists of two chains, and in which said mounting and driving means includes means permitting relative longitudinal adjustment of said chains, said one finger of each pair being mounted on one of said chains, said second finger of each pair being mounted on the other of said chains, said one of said chains being provided with hold-down portions to prevent the leading ends of the can bodies from moving upwardly from their respective fingers, and other of said chains having portions cooperable with said second finger of each pair in gripping the trailing ends of the can bodies and holding these trailing ends against upward movement.

10. In a can body conveying means, a chain conveyor having one longitudinal finger for reception in the leading end of a can body and a second longitudinal finger for reception in the trailing end of the can body, said fingers extending toward each other and being fixedly secured to links of the chain conveyor, said chain conveyor having two lugs to which said fingers are secured, respectively, the distance between said lugs being greater than the length of a can body to be conveyed, said one finger being of greater length than said second finger.

11. In a can body conveying means, a chain conveyor having one longitudinal finger for reception in the leading end of a can body and a second longitudinal finger for reception in the trailing end of the can body, said fingers extending toward each other and being fixedly secured to links of the chain conveyor, said chain conveyor having two lugs to which said fingers are secured, respectively, the distance between said lugs being greater than the length of a can body to be conveyed, said one finger being of greater length than said second finger, said chain conveyor having a portion to abut the outer side of the leading end of the can body to hold it against said one finger, said chain conveyor also having a second portion to abut the outer side of the trailing end of the can body, said second portion being cooperable with said second finger in gripping said trailing end of the can body.

References Cited in the file of this patent

UNITED STATES PATENTS

| | | |
|---|---|---|
| 1,476,405 | Kronquest | Dec. 4, 1923 |
| 1,843,453 | Littlefield | Feb. 2, 1932 |
| 2,298,955 | Mason et al. | Oct. 13, 1942 |
| 2,427,141 | Hoppe | Sept. 9, 1947 |
| 2,731,137 | Socke | Jan. 17, 1956 |